(12) United States Patent
Lewis, II

(10) Patent No.: US 8,977,104 B2
(45) Date of Patent: Mar. 10, 2015

(54) TAGGING VIDEO CONTENT

(75) Inventor: Kirk Mario Lewis, II, Arlington, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 254 days.

(21) Appl. No.: 13/604,358

(22) Filed: Sep. 5, 2012

(65) Prior Publication Data

US 2014/0064706 A1    Mar. 6, 2014

(51) Int. Cl.
*H04N 5/94* (2006.01)
*H04N 5/76* (2006.01)
*H04N 5/93* (2006.01)
*H04N 9/82* (2006.01)
*G11B 20/00* (2006.01)

(52) U.S. Cl.
CPC *H04N 5/93* (2013.01); *G11B 20/00* (2013.01); *H04N 5/76* (2013.01); *H04N 9/8205* (2013.01)
USPC .......................................... 386/241; 386/239

(58) Field of Classification Search
None
See application file for complete search history.

(56) References Cited

U.S. PATENT DOCUMENTS

2010/0199179 A1* 8/2010 Suzuki et al. ................. 715/702
2012/0047119 A1* 2/2012 Kandekar et al. ............ 707/705

* cited by examiner

*Primary Examiner* — William C Vaughn, Jr.
*Assistant Examiner* — Eileen Adams

(57) ABSTRACT

A method includes identifying video content that includes an audiovisual component, receiving an identification of the audiovisual component, and receiving at least one component location of the audiovisual component in the video content. Each component location indicates a time and a screen position with which the audiovisual component is associated within in the video content. Component information associated with the audiovisual component is received. A video tag is generated based on the audiovisual component and the component information. The method includes populating one or more fields associated with the video tag based on the component information, the identification of the audiovisual component, and the at least one component location. The method also includes presenting the video tag to a user. The video tag is selectable to present the video content at the at least one component location.

20 Claims, 13 Drawing Sheets

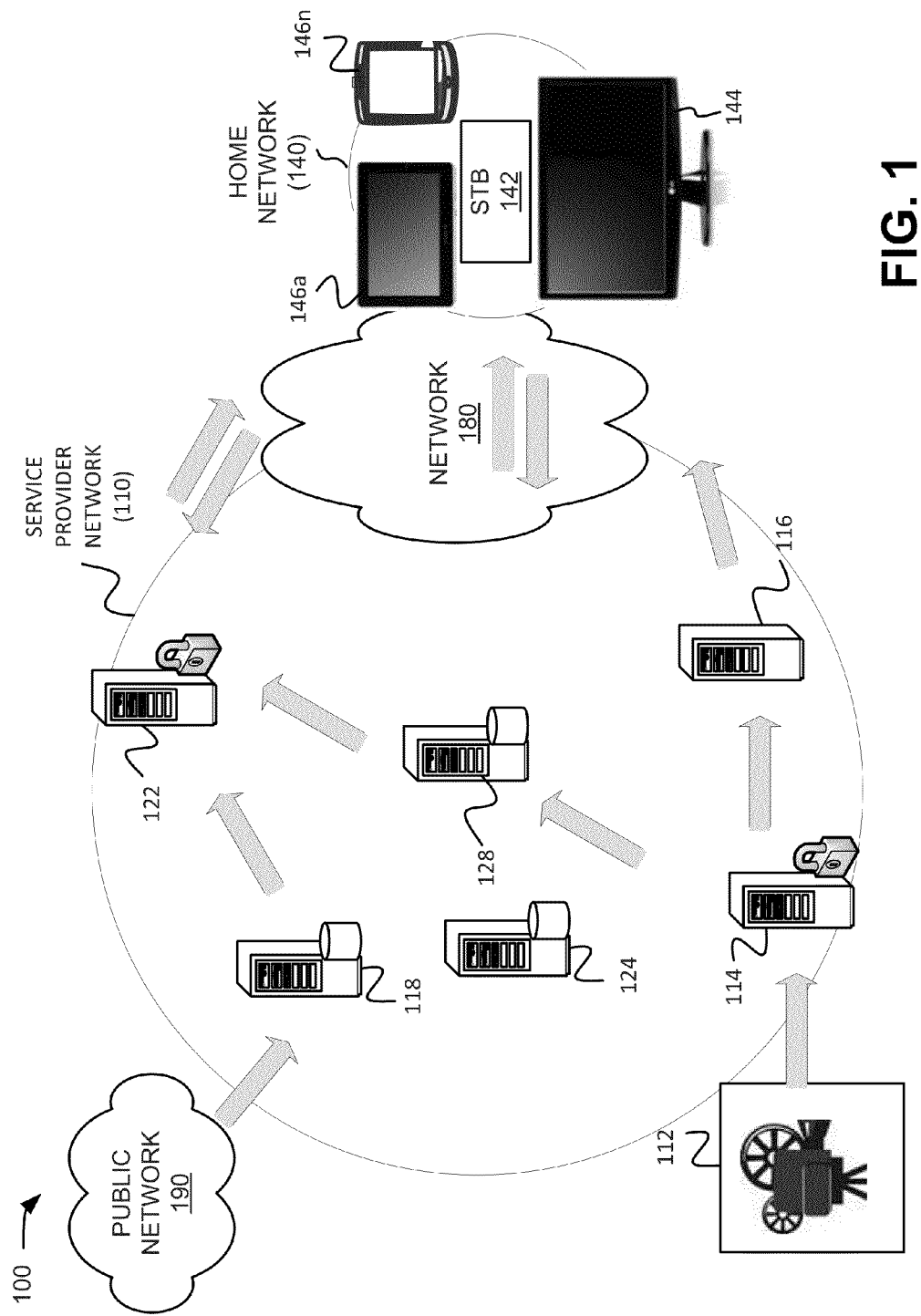

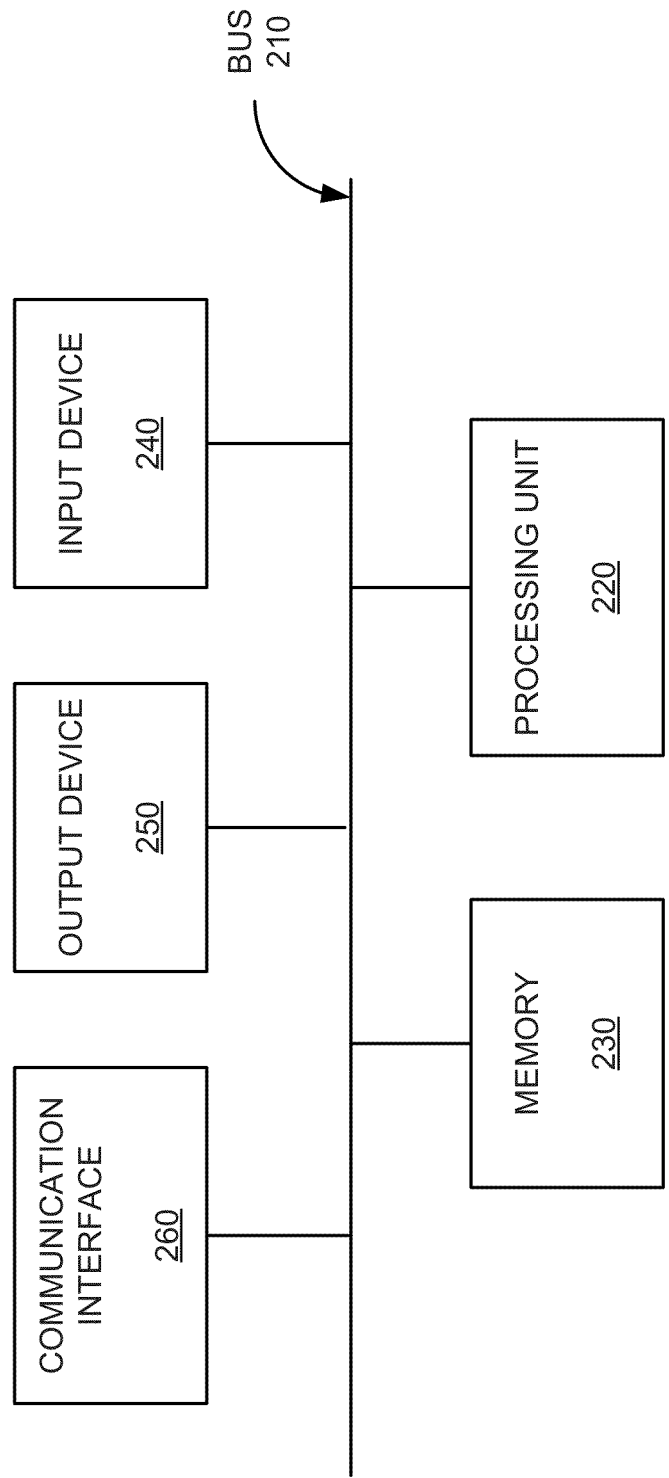

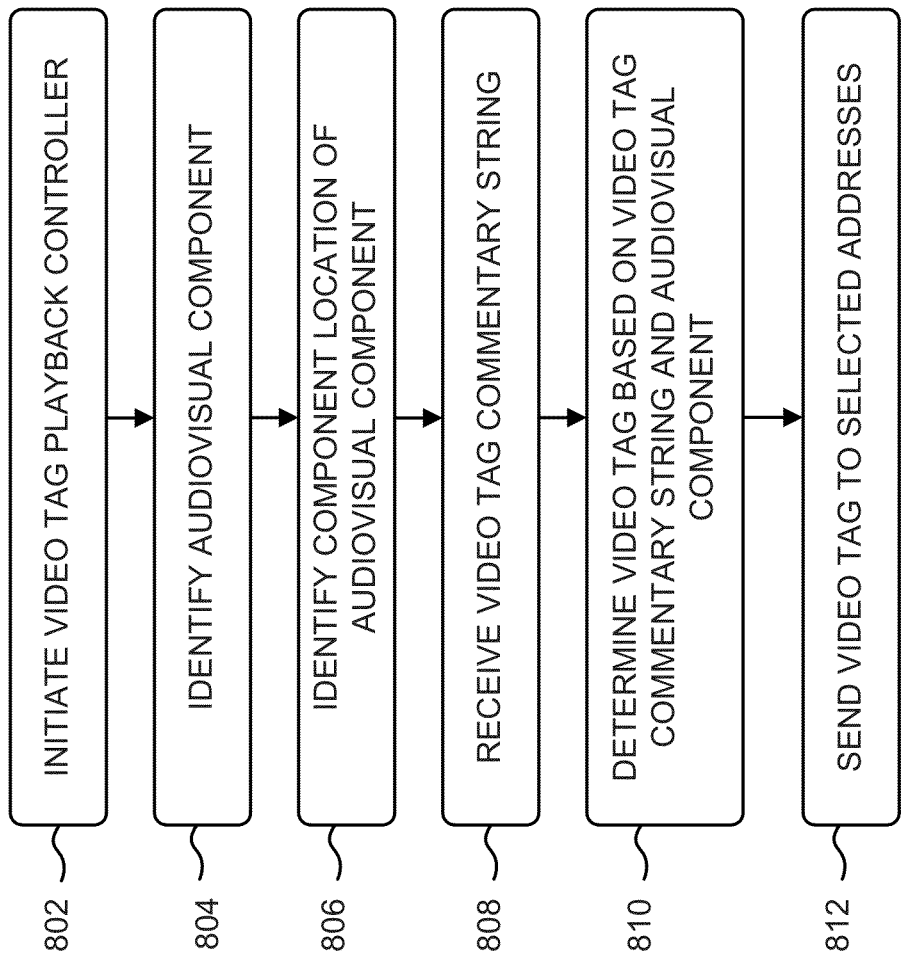

TAGGING VIDEO CONTENT

BACKGROUND

Video service providers currently provide multiple services and programs, including cable television, network television, and video on demand, to their customers. In some instances, individual customers may receive combinations of these multiple services from a single video service provider. Video service providers manage relationships with their customers using customer accounts that correspond to the multiple services.

BRIEF DESCRIPTION OF THE DRAWINGS

FIG. 1 illustrates an exemplary network in which systems and methods described herein may be implemented;

FIG. 2 illustrates an exemplary configuration of one or more of the components of FIG. 1;

FIG. 8 is a flowchart of an exemplary process for user video tagging.

DETAILED DESCRIPTION OF PREFERRED EMBODIMENTS

Figure 3A:
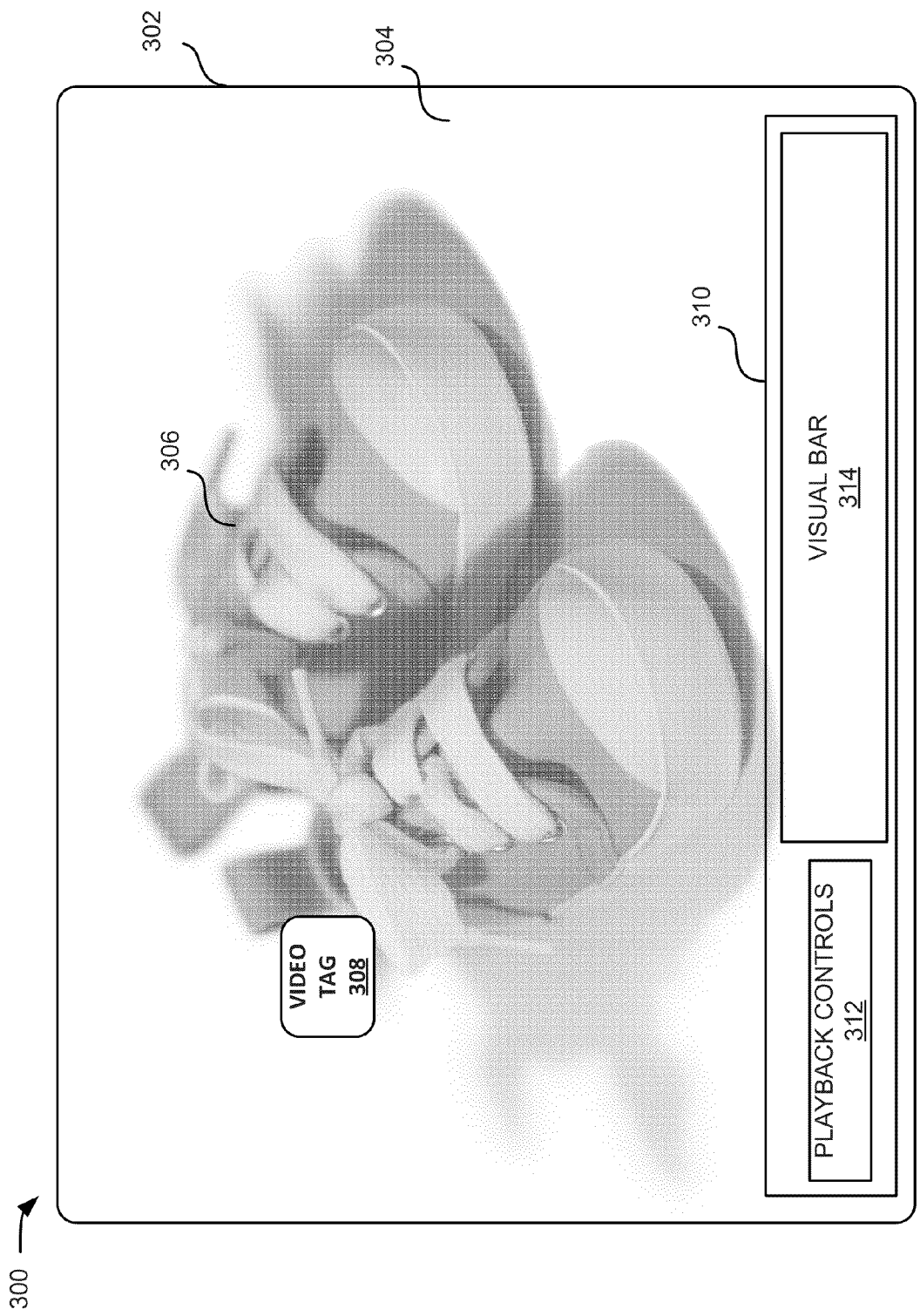
FIG. 3A is a diagram of an exemplary user interface with a video tag playback controller.

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may enable tagging of audiovisual components of video content that may be displayed at a user device. Audiovisual components, such as objects, person, etc., may be identified at component locations in video content. A component location of the audio component may be temporal and/or spatial position (i.e., located at a particular time or over a range of time and/or positions) in the video content. A video tag may be determined based on the audiovisual component and applied to the video content in association with the identified audiovisual component. Tags may be saved or book marked by the end user to an associated account. Saved tags may send additional information to the end users specified communication method or device (e.g., email address, cellular communications device, etc.).

Consistent with embodiments described herein, a device associated with an end user may generate a video tag. Additionally, video tags may be associated with particular sponsors and may include purchasing information on products found within video content.

As used herein, the terms "user," "consumer," "subscriber," and/or "customer" may be used interchangeably. Also, the terms "user," "end user," "consumer," "subscriber," and/or "customer" intended to be broadly interpreted to include a user device or a user of a user device.

FIG. 1 is a diagram that illustrates an exemplary environment 100 in which systems and/or methods described herein may be implemented. As shown in FIG. 1, environment 100 may include a service provider network 110, home network 140, an access network 180, and a public network 190. Service provider network 110 may include a content provider 112 (or alternatively, service provider network 110 may receive video content from content provider 112), a content processing system 114, a content delivery system 116, a video tagging server 118, an application server 122, a profile server 124, and a license server 128. Home network 140 may include one or more set top boxes (STBs) 142, televisions 144, one or more user devices 146, and/or personal computers. Devices and/or networks of FIG. 1 may be connected via wired and/or wireless connections.

Service provider network 110 may collect, generate, and provide video content to subscribers of a video service. Video content may include, for example, encoded video content in any of a variety of formats, including, for example, Multi view Video Coding (MVC), Moving Pictures Experts Group (MPEG)-2 transport stream (TS), MPEG-4 advanced video coding (AVC)/H.264. Service provider network 110 may also provide support services in environment 100, including authentication, authorization, and billing of subscribers for particular video services.

Content provider 112 may include one or more providers of video content. For example, content provider 112 may include a television network, a cable television station, a film distributor, etc. Content provider 112 may provide video content to content processing system 114 in a variety of formats, such as a baseband video signal, MPEG video, etc.

Content processing system 114 may store and process video content. Content processing system 114 may perform encoding operations on video content using, for example, public/private keys. Content processing system 114 may also perform transcoding operations on the video content. Content processing system 114 may store video content in encrypted and/or encoded form.

Content delivery system 116 may provide video content, instructions, and/or other information to home network 140 and associated devices, such as STB 142 and user devices 146a-146n (collectively referred to as user devices 146 and individually as user device 146). In one implementation, content delivery system 116 may provide broadcast video content via a QAM based system that may be limited in capacity based on available bandwidth (i.e., a number and/or quality of channels may be limited based on the capacity of service provider network 110). In other implementations, content delivery system 116 may provide video content via adaptive coding modulation (ACM).

Content delivery system 116 may temporarily store and provide content that is the subject of a content request from user device 146 and/or STB 142. In one implementation, access to content delivery system 116 (e.g., by STB 142 and/or user device 146) may be restricted by a service provider that operates content delivery system 116. For example, access to content delivery system 116 may be restricted to particular users with particular subscription packages and enforced by, for example, password protection (for a user), device identifiers (for user devices 146a-146n, STB 142 and/or home network 140), and/or application identifiers (e.g., residing on user devices 146a-146n, STB 142 and/or portable media). Content delivery system 116 may include implementation devices (not shown), such as a content server, a policy management server, a streaming device, a router, a content cache, etc.

Video tagging server 118 may provide video tags in association with audiovisual components of video content that may be displayed at user device 146 and/or television 144 (in association with STB 142). An audiovisual component is an image and/or a sound that is separately identifiable in video content and may include objects, persons, dialogue, music, etc. A video tag is an identifier of a particular audiovisual component. The video tag may be visible in proximity to the audiovisual component on the screen of a displaying end user device (e.g., TV 144) or may include information provided in relation to an identified audiovisual component (e.g., information may be provided when the user provides an indicator of interest in the audiovisual component). The video tag may include additional information regarding the associated audiovisual component. For example, the video tag may include purchasing information, etc., for the audiovisual component.

Video tagging server 118 may receive video tag information for each specific audiovisual component from an administrator, sponsor, or end user (e.g., from STB 142 or an administrative user device (not shown) in environment 100). Each block of video tag information may be categorized by time and prioritized by relevance to the user (e.g., determined by user profile, previous tags applied by the user, sponsor, administrator, a combination of rules provided by user/administrator, sponsor, etc.). Each block of video tag information may consist of metadata, such as a tag start time, a tag end time, a tagged by, tag date, tag time, tag location, a tag type (e.g. biographical information, shopping, etc.), tag custom (e.g., searchable attributes of audiovisual component, such as a weight, a color, a size, based on user input), a tag rating (e.g., provided by an aggregation of ratings from preceding users), a tag flag (e.g., an identifier of possible objectionable material), etc. Additionally video tags may include information provided in association with a sponsor, such as a name of the sponsor, a sponsor ID, a sponsor uniform resource locator (URL), a promotional URL, a sponsor category, a sponsor image (e.g., a small, medium, and/or large image associated with the sponsor), a sponsor rating, etc.

According to one embodiment, video tagging server 118 may identify audiovisual components at spatial and/or temporal locations, hereinafter "component locations", within the video content (i.e., the audiovisual component may be identified at a particular time and/or screen location in the video content). For example, video tagging server 118 may perform image analysis (e.g., based on a database of images of persons, objects, etc.) and sound analysis of the video content to identify different audiovisual components on a frame by frame, or scene by scene basis (e.g., a name of an actor, a type and brand of a car, etc.). Video tagging server 118 may identify a time and a screen location (e.g. pixel location or pixel range) at which the audiovisual component occurs.

Application server 122 may provide one or more applications that may allow subscribers to browse, purchase, rent, subscribe, and/or view video content. Application server 122 may authenticate a user who desires to purchase, rent, or subscribe to video content. In one implementation, the interactions between application server 122 and STB 142 or user device 146 may be performed using the hypertext transfer protocol (HTTP) or the secure HTTP (HTTPS). In another implementation, the interactions between application server 122, STB 142 and user device 146 may be performed using another type of protocol.

Profile server 124 may store user profile information for users (e.g., users of user devices 146). The user profile information may include various information regarding a user, such as login information (e.g., a user identifier and a password), billing information, address information, types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices, such as STB 142, user device 146, etc. In one implementation, profile server 124 may store video tag settings associated with the user. Application server 122 may use the user profile information to authenticate a user (or associated users) and may update the user profile information based on the user's activity (e.g., with the user's express permission).

License server 128 may provide key and license management. License server 128 may communicate with user devices 146 and/or STB 142 directly or via application server 122. For example, license server 128 may receive a request from a STB 142 for a license relating to video content that STB 142 has downloaded. The license may include information regarding the type of use permitted by user device 146 or STB 142 (e.g., a complementary application or content, a purchase, a rental, limited shared usage, or a subscription) and a decryption key that permits STB 142 to decrypt the video content or application. In one implementation, the communications between license server 128 and STB 142 may be conducted over a secure channel, may include public and private keys, or may include other forms of secure communication.

Home network 140 may include one or more devices that transmit requests to content delivery system 116, video tagging server 118, application server 122, profile server 124, and/or license server 128, and receive information from content delivery system 116, video tagging server 118, application server 122, profile server 124, and/or license server 128. Home network 140 may include, for example, one or more STBs 142, televisions 144, one or more user devices 146, and/or personal computers. Home network 140 may also include other devices (not shown), such as additional media storage devices, a home router, a gateway (e.g., an optical network terminal (ONT)), etc.

Home network 140 may connect to content delivery system 116, video tagging server 118, application server 122, profile server 124, license server 128, access network 180, and/or other networks (e.g., public network 190). In one implementation, devices in home network 140 may connect to content delivery system 116 (e.g., via access network 180) to receive managed services (e.g., such a multimedia content provided with a guaranteed quality of service (QoS)) via a closed content distribution channel. The closed content distribution channel may be implemented through a subscription multimedia service providing network access through, for example the gateway, home router, or a local set-top box. Thus, access to content delivery system 116 may be restricted to particular users, particular devices, such as STBs 142, user devices 146, and/or applications running on the devices.

STB 142 may receive content from content delivery system 116 and/or an external network, such as the Internet, and output the content to TV 144 and/or user devices 146*a*-146*n* for display. For example, STB 142 may receive a range of channels from content delivery system 116 via QAM. STB 142 may output the content as on-demand content and/or live TV channels (i.e., ongoing content that may not be available on an on-demand basis). STB 142 may receive content from an external network, such as the Internet, based on information provided via service provider network 110. For example, STB 142 may be directed to receive one or more channels via an Internet video feed. STB 142 may include a component (e.g., a cable card or a software application) that plugs into a host device (e.g., TVs 144, and/or other devices, such as personal computers, mobile telephones, etc.) that allows the host device to display content. STB 142 may also be implemented as a home theater personal computer (HTPC), an optical disk player (e.g., digital video disk (DVD) or Blu-Ray™ disc player), a cable card, etc. STB 142 may receive commands from other devices in environment 100, such as a remote control (not shown) and user device 146. STB 142 may include one or more digital video recorders (DVRs) that allow STB 142 to record content and to playback the recorded content at a later time. In one embodiment, STB 142 may include a microphone and/or a camera.

TV 144 may include speakers as well as a display. TV 144 may play content, for example, received from STB 142. While some embodiments described below may use TV 144 to view content, other embodiments may use any device (e.g., a computer or a mobile phone) to display/provide content.

User device 146 may include any device capable of communicating via a network, such as home network 140 and/or access network 180. User device 146 may include an interactive client interface, such as a graphic user interface (GUI), and a transmitter capable of sending a remote signal to STB 142. User device 146 may include digital rights management (DRM) functionality to retrieve security information (e.g., decryption keys) and decrypt protected content received from content delivery system 116. Examples of user device 146 may include a mobile phone, a tablet, a personal computer, or another device that may receive video program related items, such as video program related applications and video program related content, and provide the video program related items at user device 146.

Access network 180 may provide customers with multimedia content provided, for example, by content delivery system 116. Access network 180 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 180 may include a number of separate networks that function to provide services to home network 140. In one implementation, access network 180 may terminate at home network 140 via an optical communication link, such as an optical fiber provided to home network 140. In another possible implementation, access network 180 may terminate at home network 140 via a coaxial cable. In still another implementation, access network 180 may terminate at home network 140 via a wireless (e.g., satellite) connection.

Public network 190 may include a WAN, an intranet, a telephone network (e.g., the Public Switched Telephone Network), or a combination of networks. Public network 190 may include, for example, an untrusted network, such as the Internet. Public network 190 may further include transport and/or network devices such as routers, switches, and/or firewalls.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 116 may be implemented as multiple, possibly distributed, devices.

In implementations described herein, a video tagging service may provide video tags for audiovisual components of video content provided at a user device 146 or STB 142. The video tagging service may be supported by back end servers, including video tagging server 118.

FIG. 2 is a diagram of example components of a device 200. Each of content provider 112, content processing system 114, content delivery system 116, video tagging server 118, application server 122, profile server 124, license deserver 128, and/or devices in home network 140, such as STB 142, user devices 146*a*-146*n*, may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing machine-readable instructions contained in a computer-readable medium, such as memory 230. A computer-readable medium may be defined as a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3A illustrates an exemplary user interface 300 with a video tag playback controller 310. As shown in FIG. 3A, user device interface 300 includes a display 302, video content 304 that includes an audiovisual component 306, a video tag 308, and video tag playback controller 310. The particular arrangement and number of components of user interface 300 shown in FIG. 3A are illustrated for simplicity. User interface 300 may be displayed on television 144 or on user device 146.

As shown in FIG. 3A, display 302 may display video content 304 (received, for example, from content delivery system 116). Video content 304 may include an audiovisual program, such as a movie, television program, etc., which includes audiovisual items 306. Audiovisual component 306 may include an object or sound in video content 304 (e.g. physical objects, such as a car, clothing worn by a person in the video content or sounds that identify an idea, such as a song, verbal references to particular entities, etc.). For example, a movie scene may include a man walking towards a car while speaking on a cell phone to his wife. Audiovisual components 306 may include the man's shoes and clothing, the car, the actor, the cell phone, etc. Examples of things that may correspond to audiovisual components 306 include a person, a consumer electronics item, a toy, a clothing item, a motor vehicle, a building, a song, or a word Video tag 308 may identify audiovisual component 306. For example, video tag 308 may identify an area of the screen corresponding to audiovisual component 306. Video tag 308 may include a separate visual component arranged in proximity to audiovisual component 306 or highlighting of audiovisual component 306 (e.g., audiovisual component 306 may "glow" or change colors). Alternatively, video tag 308 may include an icon that is displayed in video tag playback controller 310 (i.e., in the section of the screen reserved for video tag playback controller 310) and may not be displayed in proximity to audiovisual component 306. Video tag 308 may or may not be displayed over (or in association with) audiovisual component 306, depending on the users preference provided based on GUI settings, legal requirements, etc.

Video tag 308 may include one or more fields (component information) that describe/define audiovisual component 306 as well as additional information provided by creators of the video tags 308, such as commentary from users and links, application programming interfaces (APIs) and purchasing information for the audiovisual component 306 provided by sponsors. The fields may include a name of the movie (i.e., video content 304), a component location of the video tag 308, a name of the audiovisual component 306, and supplementary information based on the audiovisual component, such as a biography (if the audiovisual component is a person), a price (if the audiovisual component is a commercial item), and/or a scene type.

Video tag playback controller 310 may be implemented on devices (e.g., STB 142 and TV 144, or user device 146) that support user interaction methods and have an active connection to a support network(s) for video tagging, such as the Internet and/or service provider network 110. Video tag playback controller 310 may include playback controls 312 and visual bar 314 that implement the video tagging service at user device 146. Video tag playback controller 310 may be programmed to appear based on a particular input (e.g., when a screen of user device 146 is touched) and may disappear after a predetermined time if no (further) input is received.

Playback controls 312 may provide options for a user to access information regarding video tags. Playback controls 312 may provide control options, such as turning video tags 308 on or off, displaying video tags 308 in an overlay format, selecting types of video tags 308 to display (e.g., different categories, such as actors, commercial items, performance statistics, etc.), sources of video tags 308 (e.g., particular persons that the user wishes to display video tags 308), etc. For example, the user may provide an input for playback controls 312 to select one or more categories of video tags 308 to display. If video tags 308 are within the one or more categories, the video tags 308 may be displayed in association with the video content 304. Playback controls 312 may allow a user to find, select, play, save, skip, or record video content 304 based on particular video tags 308. For example, playback controls 312 may allow a user to save video tags 308 for later reference (e.g., in a video tag clipboard (not shown)). If a user saves video tags 308 (e.g., the user inputs a save request in association with video tag 308) while watching video content 304, the user may receive an email (or an update to an account associated with video tags 308) with detailed information about audiovisual component 306. Alternatively, playback controls 312 may save user interests based on video tags 308 and may include the saved interests in determining video tags 308 that are to be provided for the user. In another example, the user may skip (when recording or playback) video content 304 that includes a particular video tag (e.g. a commentator that the user finds annoying). The user may also record based on the video tag including particular keywords (e.g. the user may record video content 304 that includes the keyword "Jamaica", so that all scenes set in (or associated with) Jamaica are recorded).

Visual bar 314 may include information based on audiovisual component 306, such as a name, a price, features, related items, link information, a retailer where the item may be purchased, etc. Visual bar 314 may be located in close proximity to playback controls 312 (e.g., beside playback controls 312 in FIG. 3, above or below playback controls 312 in other instances). In one embodiment visual bar 314 may include information about the audiovisual component 306 provided based on a sponsorship model. For example, a company may sponsor video content 306 provided to user device 146. The user may participate in a "screen buy" in which the company may sponsor a new release movie (a video content 304 item) in exchange for the user accepting/enabling specific video tags 304 from the sponsor. The video tags 308 may provide purchasing information and, for example, related products from the sponsoring company.

Figure 3B:
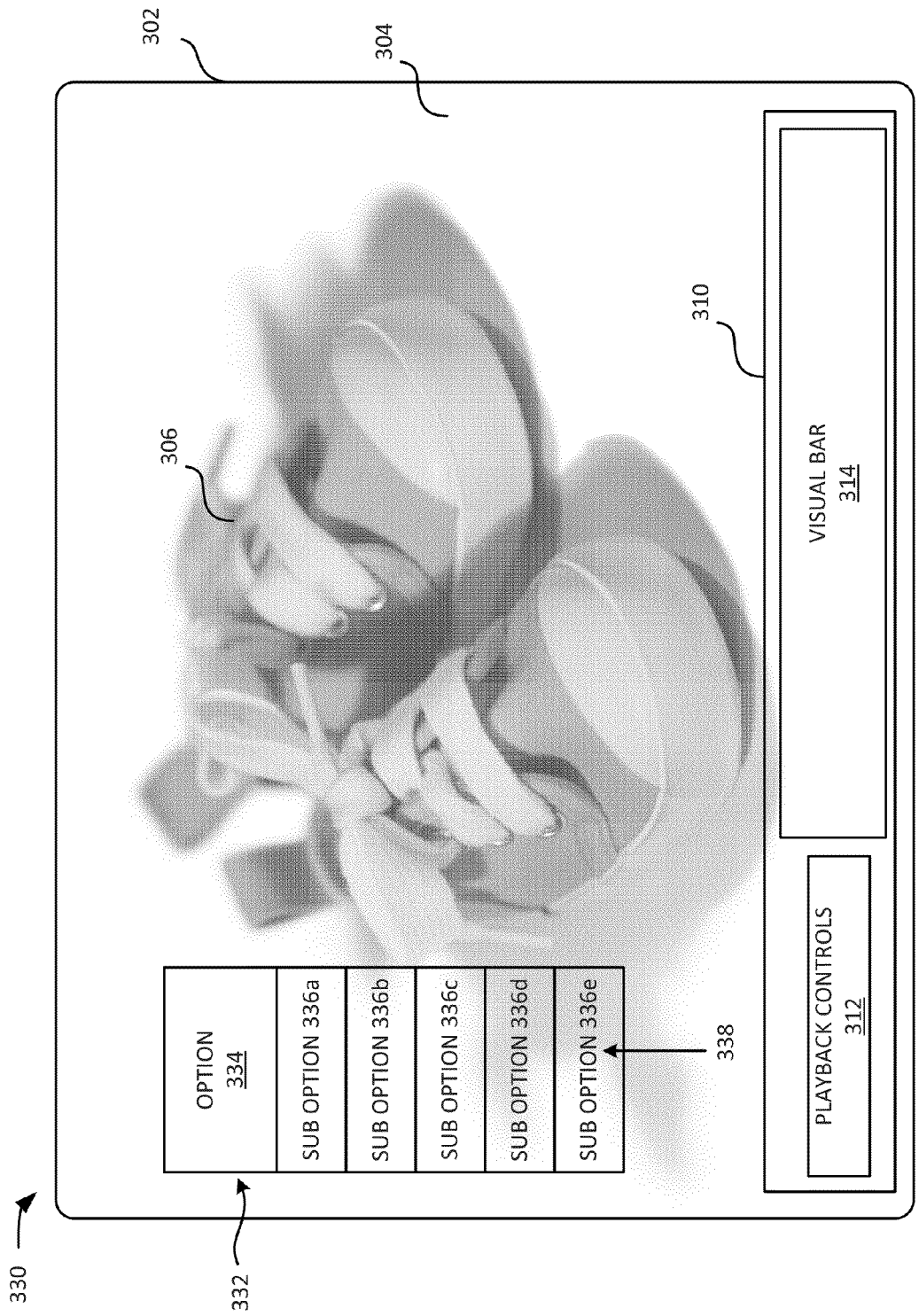
FIG. 3B is a diagram of an exemplary user interface with a list of video tag options.

FIG. 3B is a diagram of an exemplary user interface 330 with a list of video tag options. As shown in FIG. 3B, user device interface 330 includes display 302, video content 304 that includes an audiovisual component 306, a video tag 308, and video tag playback controller 310. Additionally, interface 330 includes a video tag option list 332, which includes an option 334, and a number of sub options 336a-336e. The particular arrangement and number of components of user interface 330 shown in FIG. 3B are illustrated for simplicity.

Video tag playback controller 310 may provide the user a number of options 334 for interacting with video tags 308. Options 334 may include viewing video tags 308, adding video tags or commentary (as described hereinbelow with respect to FIGS. 4A to 4C), selecting different types of video tags 308 to display, and/or selecting to display video tags 308 based on different users and/or sponsors.

Video tag option list 332 may include a list of sub options 336a-336e that the user may select for video tags 308. For example, if the user selected different types of video tags to display, the available types of video tags may be displayed as sub options 336a-336e in video tag option list 332, such as persons in a movie scene, audio (e.g., music) in a movie scene, a location of a movie scene, commercial objects in a movie scene, etc.

According to one embodiment, the user may select a "show video tags 308" option for a user to see more information regarding audiovisual components 306. The user may pause playing of video content 304 and provide an input (e.g., slide their linger around a display of user device 146, provide a gesture for motion capture associated with user device 146, etc.) to identify video tags 308, which may include information about a scene, such as commentary or products, depending on user selected preferences. In one embodiment, video tags 308 may provide audible information about different audiovisual components 306 in video content 304.

According to one embodiment, the user may select a sponsor for video content 304 from a sponsor list displayed in video tag option list 332. The sponsor list may contain different types of sponsors, such as clothing, general shopping, electronics retailers, etc. The company may have a maximum number of video tags 308 for certain video content 304. The user may enable these video tags 308 by accepting the sponsorship. A company or sponsor may also provide an API that will allow the user to search a catalog provided by the company, based on the audiovisual component 306. The display of video tags 308 may be governed by parameters specified by users, administrators, sponsors, etc.

Figure 3C:
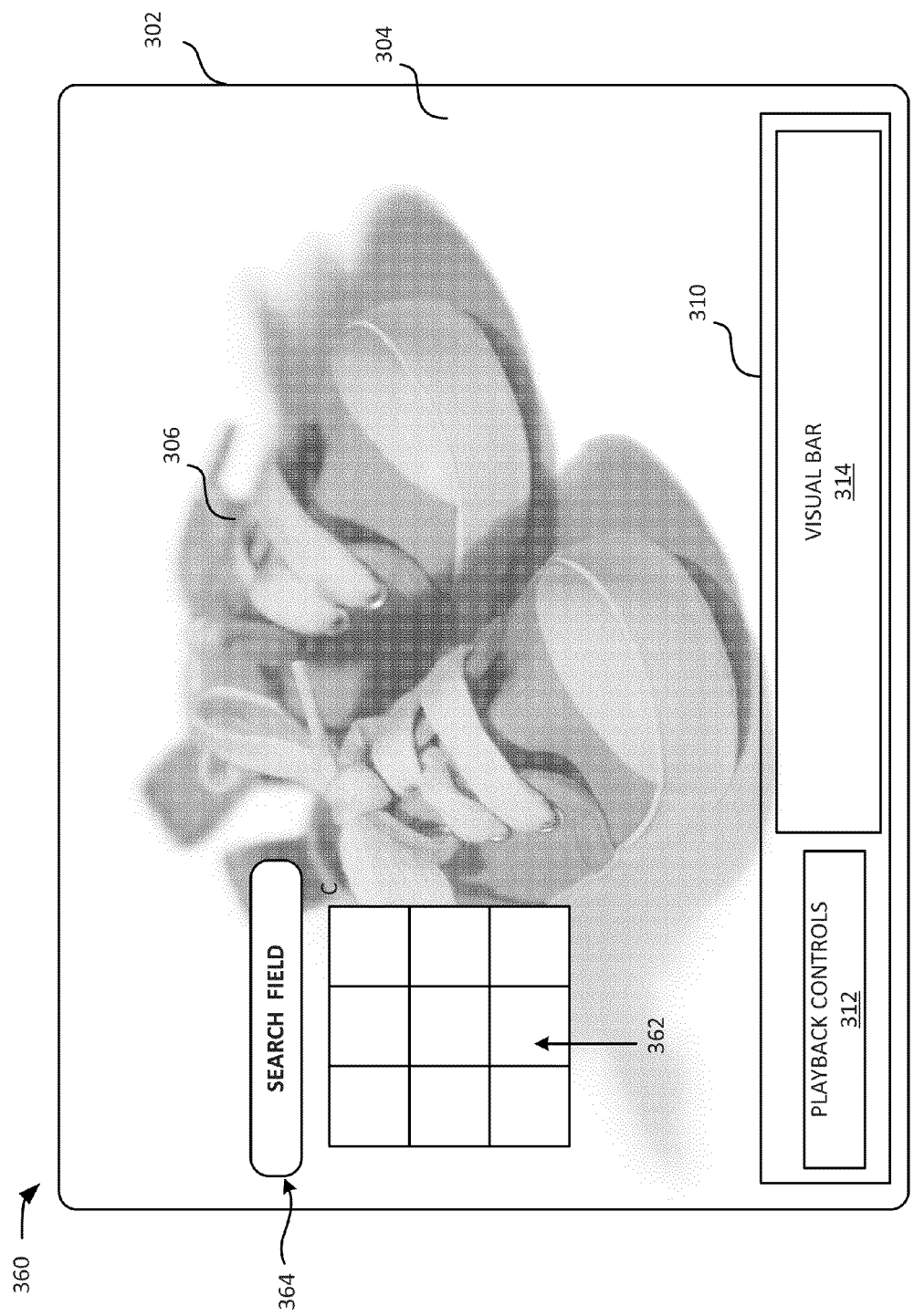
FIG. 3C is a diagram of an exemplary user interface with a video tag search field.

FIG. 3C is a diagram of an exemplary user interface 360 with a video tag search field. As shown in FIG. 3C, user device interface 360 includes display 302, video content 304 that includes an audiovisual component 306, a video tag 308, and video tag playback controller 310. Additionally, interface 360 includes an alphanumeric keypad 362 (soft keys), and a video tag search field 364. The particular arrangement and number of components of user interface 360 shown in FIG. 3C are illustrated for simplicity.

Alphanumeric keypad 362 may appear/be displayed based on a particular input provided by the user (e.g., a touch of the screen of user device 146, or a selection of an associated icon in user interface 360). The user may enter a search string in search field 364 to search for particular video tags 308 using alphanumeric keypad 362. The user may enter a search string based on terms associated with audiovisual components 306 that the user is searching for, such as a combination of a name of a particular actor, a song title, a commercial object, director, scene type, etc. For example, the user may enter an actor name, such as Jim Windsor, a commercial object, such as a hat, and a scene type, such as fight scene, in order to find a fight scene in which the actor wears a hat. In some implementations, the user may search for specific types of audiovisual components, such as a song, a scene, etc. Video tag playback controller 310 may transmit the search string to video tagging server 118. Video tagging server 118 may return a list of video tags based on the search string. The user may access the related movies at the point of the video tags by clicking on the search results.

Figure 4A:
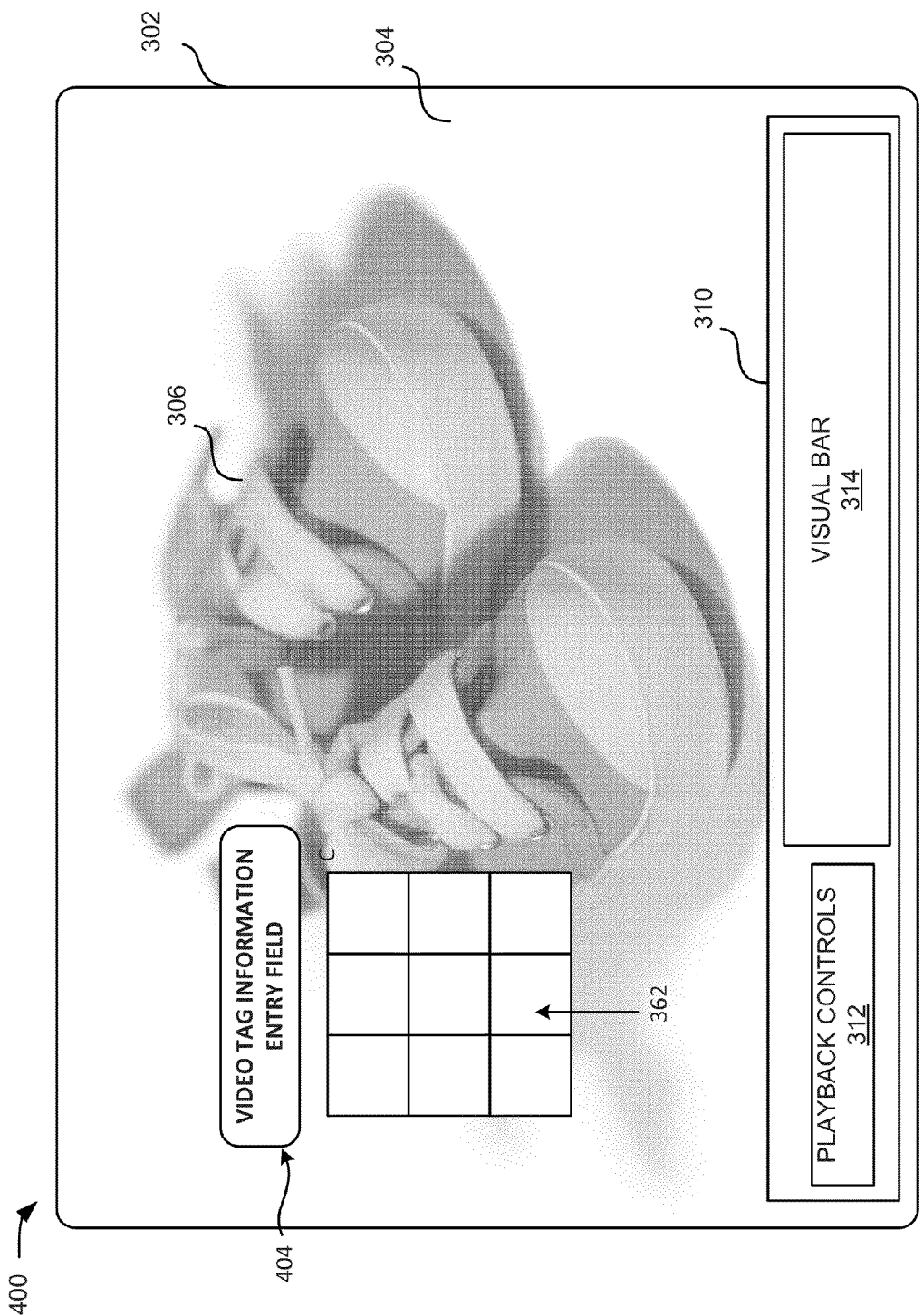
FIGS. 4A and 4B are diagrams illustrating object tracking.

FIG. 4A illustrates an exemplary user interface 400 with a video tag information entry field 404. As shown in FIG. 4A, user device interface 400 includes display 302, video content 304 that includes audiovisual component 306, alphanumeric keypad 362, a video tag information entry field 404, and video tag playback controller 310.

Referring to FIG. 4A, a user may add commentary about a particular audiovisual component 306 on the screen (i.e., in video content 304). For example, the user may touch the screen to highlight the audiovisual component 306. Machine-readable instructions implemented on user device 146 may support touch input by the user, e.g., following the users gesture for a certain amount of time, drawing a circle around a selected audiovisual component 306, etc. The machine-readable instructions may store a space and time in video content at which the selected audiovisual component 306 is located, and may be adaptive to different screen sizes of user devices 146. The user may pause playing of video content 304 until the user is finished video tagging. Alphanumeric keypad 362 may include a (relatively) small on-screen keyboard that may substantially minimize used screen space on user device 146. Alphanumeric keypad 362 may be moveable to enable the user to view selected area of the screen when tagging audiovisual component 306. Alternatively, alphanumeric keypad 362 may be selected to appear/disappear by playback controls 312.

After selecting particular audiovisual components 306, the user may enter a video tag commentary string into video tag information entry field 404 using alphanumeric keypad 362. Video tags 308 (including the just entered video tag 308) may be briefly displayed after the user enters the video tag commentary string. The video tag commentary string may include user provided commentary that is thereafter stored, by video tagging server 118, in association with audiovisual components 306 of video content 304 and may be provided to subsequent users in video tags 308 (e.g., based on a same actor, car, athlete, etc., in the same or different movies). For example, if the audiovisual component 306 is a car (or, more precisely, an image of a car), video tag commentary string may include commentary regarding the car, such as "That was my first car!!" STB 142 may transmit the video tag commentary string to video tagging server 118 and/or social media websites (e.g., Facebook, Twitter, etc., in some instances, with character limits on the length of each video tag commentary string). STB 142 may also record and transmit a date, time and component location information associated with each video tag 308 to video tagging server 118. STB 142 may also include a screen shot, a comment (the video tag commentary string), and a link to video content 304 at video tag 308 when sending video tags 308 to social media websites.

Figure 4B:
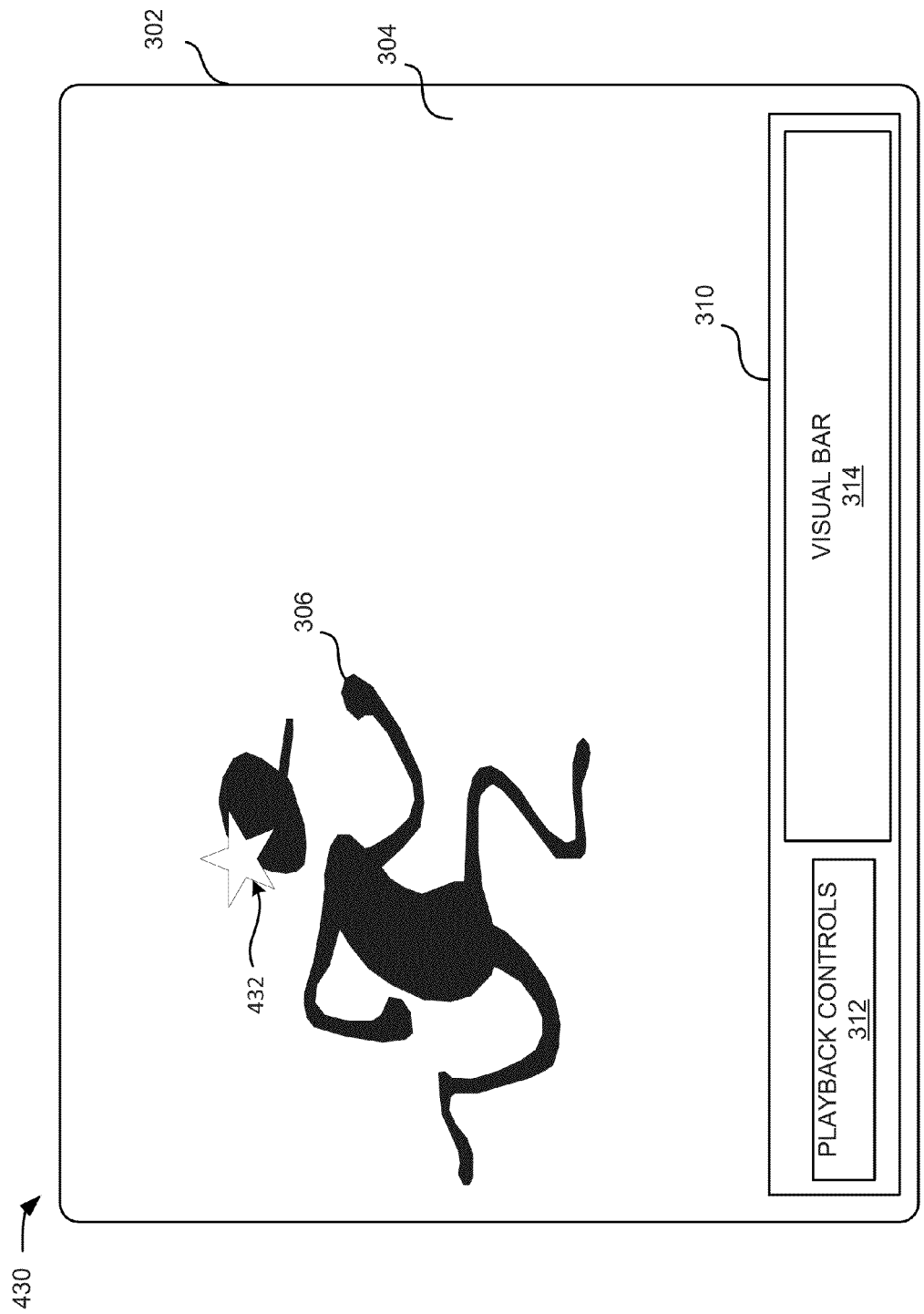
Figure 4C:
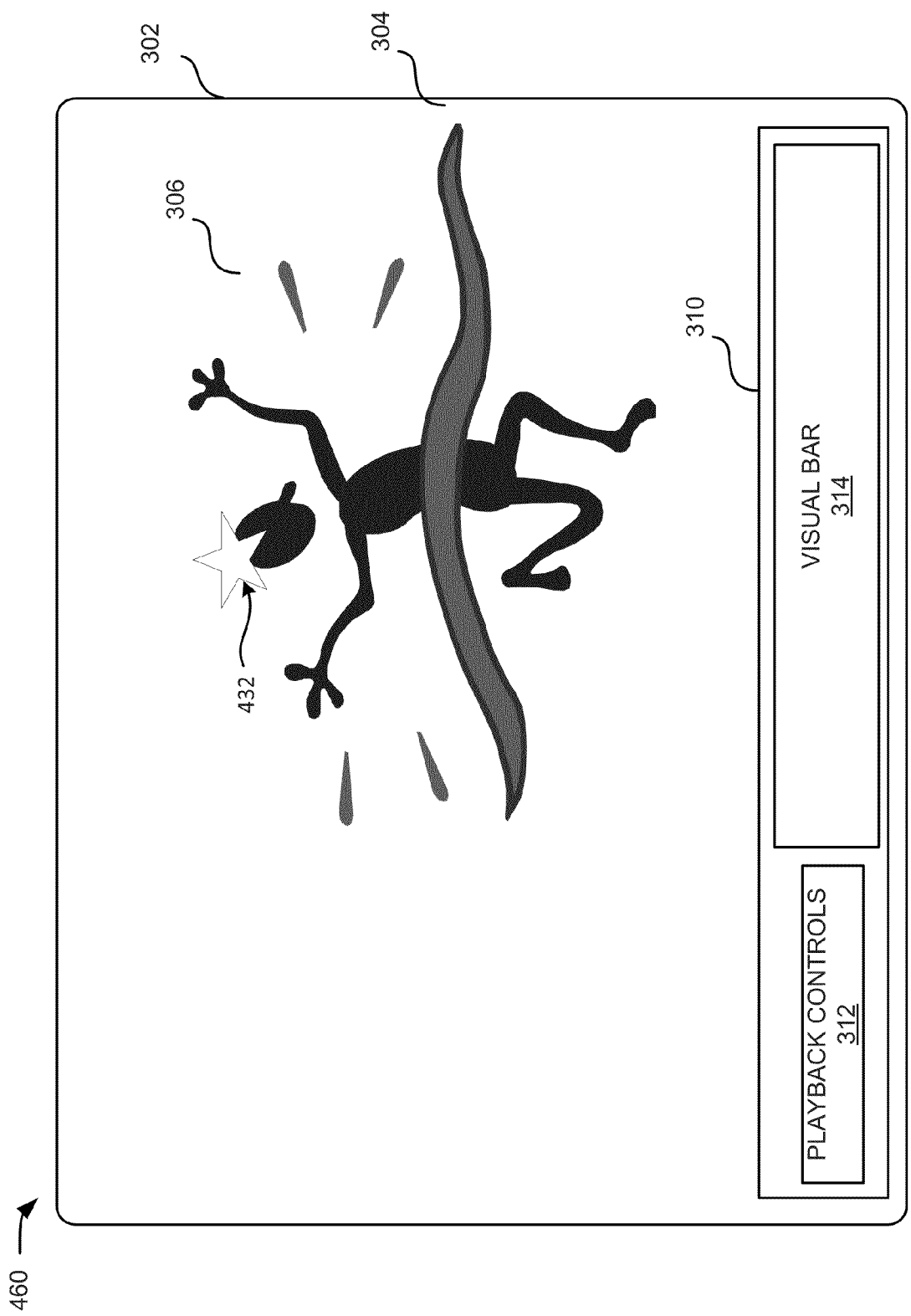
FIG. 4C is a diagram of an exemplary user interface with a video tag information entry field.

FIGS. 4B and 4C are diagrams 430 and 460 illustrating object tracking of an audiovisual component 306. For example, the user may be tracking a particular object (in this instance the head of a runner). The user may apply a marker 432 to the runner at a first time and at a particular screen position, as shown in FIG. 4B. The user may subsequently apply marker 432 to the head of the runner as shown in FIG. 4C. Machine readable instructions may determine the motion and/or audiovisual component 308 that the user wishes to capture based on the positions of marker 432.

Figure 4D:
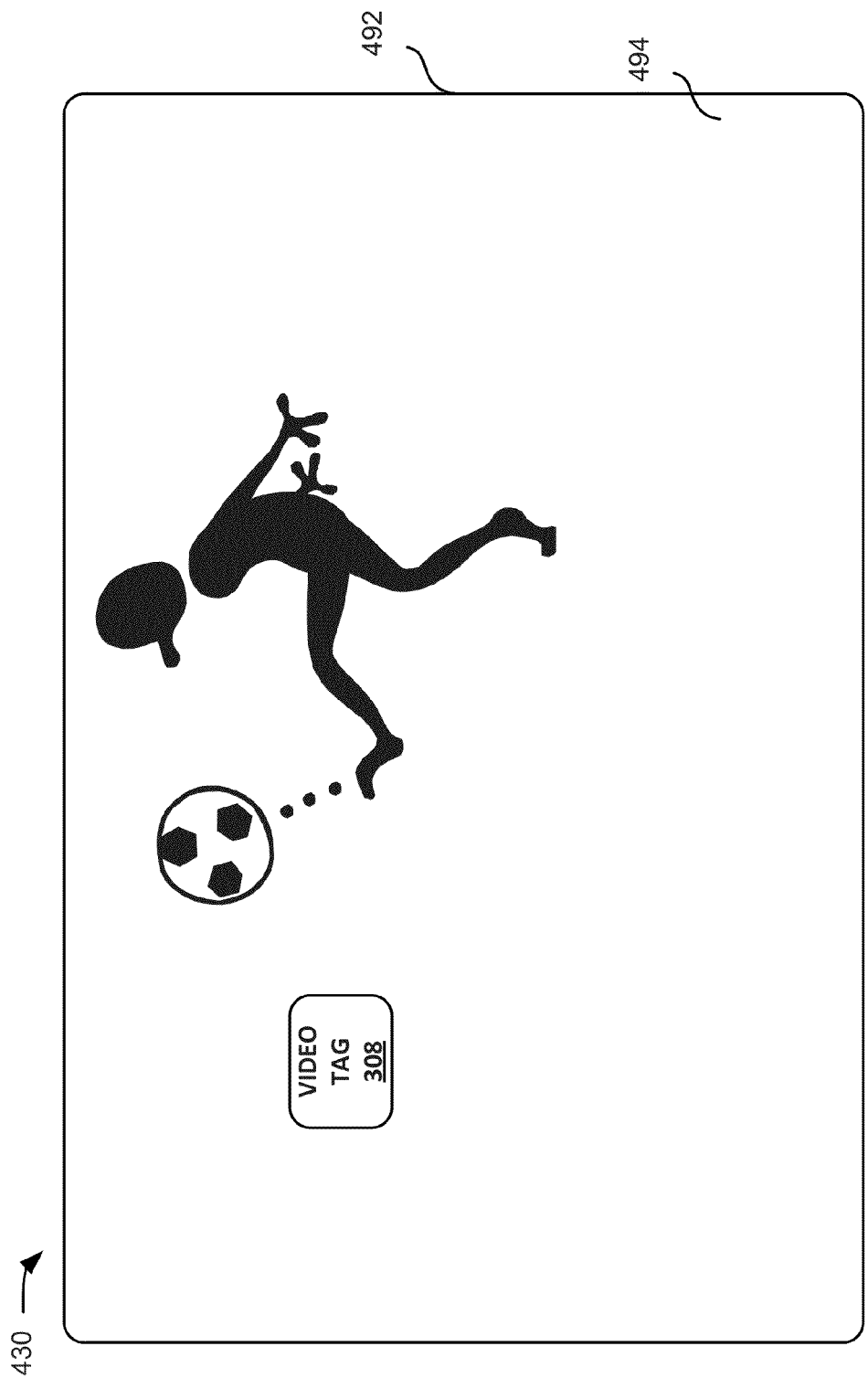
FIG. 4D is a diagram of a video tag displayed on a recipient interface.

FIG. 4D is a diagram 490 of a video tag 308 displayed on a recipient interface 492. Video tag 308 may be presented at a computer accessible document 494, such as a web page. Computer accessible document 494 may be selected based on input provided by one or more of the user, a sponsor, and an administrator for a service provider associated with the video content. Computer accessible document 494 may be searchable based on one or more of the component information (e.g., a price for the product, a website associated with the product), the identification of the audiovisual component 306, and the video content. Component information may be provided by a sponsor, may be gathered by video tagging server 118 based on a web search or may be provided by users that video tag the audiovisual component 306. In one example, the video tag 308 may be displayed on a social media page associated with the user. In another example, video tag 308 may be included in a specialized web browsable video tag document that include video tag 308 and associated information such as the name of a movie in which the video tag 308 is included and a component location at which video tag 308 may be found (i.e., a time in the movie at which the video tag appears).

According to one implementation, if the user is browsing computer accessible document 494 using an appropriately enabled device, the user may access video content 304 based on video tag 308. For example, the user may click on video tag 308 in computer accessible document 494, sending a request to video tagging server 118. Video tagging server 118 may receive the request for the video content 304 from a requester based on the video tag 308. Video tagging server 118 may determine a subscription status of the requester with the service provider associated with the video content 304, for example by sending a status request to profile server 124. If the requester is a subscriber in good standing, video tagging server 118 may provide access to the video content at a starting component location. The starting component location may be based on the component locations associated with the video tag 308. For example, the video content 304 may begin play at a first instance of the video tag 308. Alternatively, the user may be provided screen shots or other indication of different component locations and may select to start the video content 304 at that point.

According to another implementation, the user may provide video tags 308 to video tagging server 118 via a video tag enabled website. The video tag enabled website may be operable to transmit video tags and may include an interface, such as an online store or other forum, which includes items that may be displayed as audiovisual components 306 in video content 304. For example, the user may click on an API associated with a particular audiovisual component 306 (and sponsor) and receive a link to the video tag enabled website. Items in the video tag enabled website may have a video tag logo (i.e., a video tagging function) displayed in close proximity. The user may click on the video tag logo to rate or otherwise provide information regarding particular items. The user may add attributes of the audiovisual components (i.e., an attribute field) to the video tag 308, such as a color, a shape, etc. The user may search for audiovisual components based on the defined attributes. Video tagging server 118 may receive additional video tag 308 (with regard to the initial video tag that provides the link) from the video tag enabled website. Video tagging server 118 may identify information included in the one or more fields of the additional video tag that associates the additional video tag with video content based on the information included in the one or more fields of the additional video tag.

In another example, the user may identify an audiovisual component that the user wants to video tag 308 in a computer accessible document 494. The user may apply the video tag 308. At that moment, the video tag 308 may not be associated with a particular movie (video content 304). Video tagging server 118 may subsequently search the web or otherwise receive the video tag 308. Video tagging server 118 may associate the video tag 308 with particular video content based on audiovisual components 306 and keywords include in/associated with both the video tag 308 and the video content 304.

Figure 5:
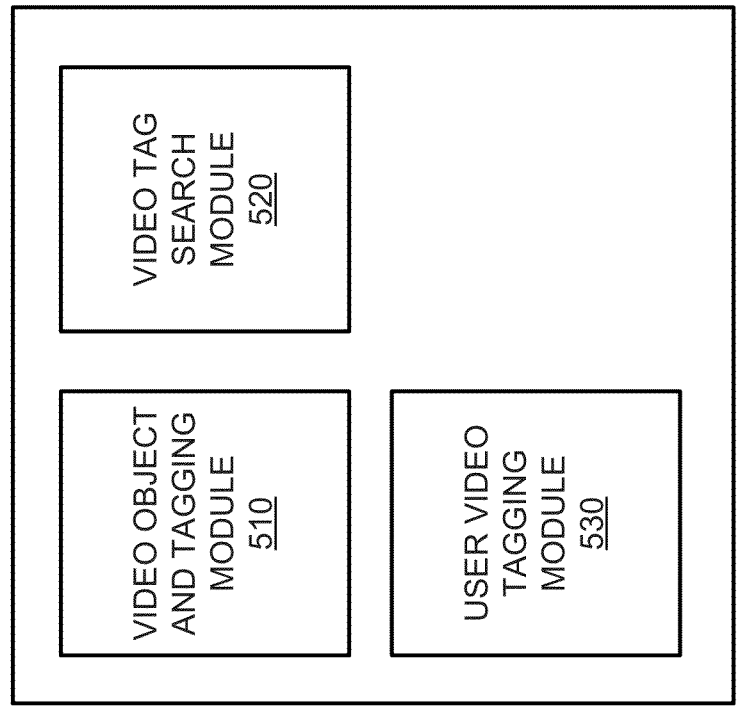
FIG. 5 is an diagram of exemplary functional components of the video tagging server of FIG. 1.

FIG. 5 is a diagram of exemplary functional components of video tagging server 118. In one implementation, the functions described in connection with FIG. 5 may be performed by one or more components of device 200 (FIG. 2). As shown in FIG. 5, video tagging server 118 may include a main video tagging module 510, a video tag search module 520, and a user video tagging module 530.

Video tagging server 118 may determine video tags associated with audiovisual components identified at component locations in video content. Video tagging server 118 may apply the video tag to the video content in association with the identified audiovisual component. The video tag may display information associated with the audiovisual component.

Main video tagging module 510 may receive video content 304 from content delivery system 116 and perform server side identification of audiovisual components 306. Main video tagging module 510 may determine video tags 308 based on information about the audiovisual components 306 provided from associated databases (not shown), such as a sponsor database (i.e., for sponsored content items, such as, for example, shoe prices, shoe models, available shoe sizes, etc. for a shoe sales organization), a biographical information database (i.e., for actors in a movie), an encyclopedia database (i.e., for general information items), etc. For example, main video tagging module 510 may perform image analysis and sound analysis of video content 304 on a frame by frame, or scene by scene basis. Main video tagging module 51.0 may identify a time and a screen location at which the audiovisual component 306 occurs. Main video tagging module 510 may track the audiovisual component 306 on a frame by frame basis to determine instances at which the audiovisual component occurs (e.g., once an identity of the audiovisual component is determined, main video tagging module 510 may track the object in the video in preceding and following frames). Main video tagging module 510 may create a video tag 308 and apply the video tag 308 to the audiovisual component 306 (e.g., insert video tag 308 in video content 304 in proximity to the audiovisual component 306).

Video tag search module 520 may allow the user of user device 146 to search among video tags 308. For example, video tag search module 520 may allow the user to search for video tags 308 in a particular movie or in a database of video tags 308. Video tag search module 520 may return a link to a number of search results. The user may select any of the search results and user device 146 may place the user in video content 304 at a "searched for" particular video tag 308 (i.e., starts play of video content 304 at a time in video content 304 corresponding to the video tag 308), if the video content 308 includes a movie for which the user has access privilege. If the user does not have current access privilege for video content 304 (e.g., a movie or television program), video tag search module 520 may return an API for the user to sign up for a video service or to purchase access to video content 304 and place the user at the video tag 308 in the video content 304 after sign up (or alternatively, the user may be allowed a certain amount of content without purchase).

User video tagging module 530 may receive video tags 308 from users and store the video tags 308 and associated information, such as a particular film, a component location of the audiovisual component 306 on which a video tag 308 is based, ratings associated with the video tag 308, etc., in an associated database. User video tagging module 530 may perform a gate keeping function for video tags 308 received from different users. For example, user video tagging module 530 may filter (or flag for administrators) explicit language that is included in video tags 308 (e.g., video tags 308 may be displayed based on a viewer rating of the video program, such a parental guidance 13 (PG-13)). User video tagging module 530 may receive ratings for each video tag 308 (e.g., from a social media website, user devices 146, etc.) and provide video tags based on a rating system (e.g., based on recent comments, popularity, etc.). User video tagging module 530 may store video tags 308 in a database that may be accessed by main video tagging module 510 when determining video tags 308 for video content.

Video tags 308 may be disseminated and rated by users in social media context, in a manner that allows for viral spreading of video tags 308. For example, user commentary may be linked to video content 304 using video tags 308 that allow the user to access the video content 304 from social media websites.

Figure 6:
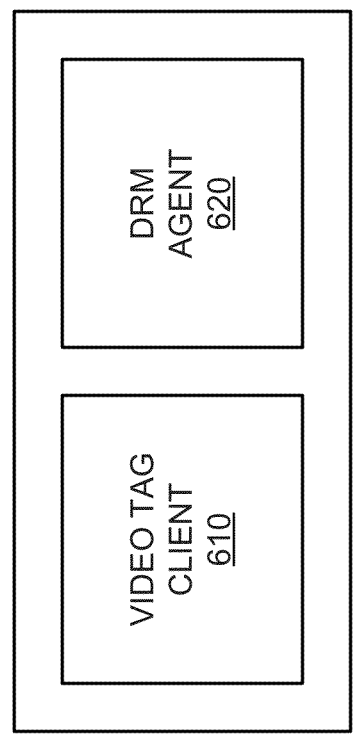
FIG. 6 is a diagram of example functional components of the set top box of FIG. 1.

FIG. 6 is a diagram of example functional components of STB 142 (or user device 146). In one implementation, the functions described in connection with FIG. 6 may be performed by one or more components of device 200 (FIG. 2). As shown in FIG. 6, STB 142 may include a video tag client 610 and a DRM agent 620.

Video tag client 610 may include hardware or a combination of hardware and software that may enable STB 142 (or user device 146) to interface with content delivery system 116, video tagging server 118, application server 122, profile server 124, and/or license deserver 128 and to provide a video tagging service for video content 304 from content delivery system 116 and the Internet to the user in a seamless manner. Video tag client 610 may provide client-side support for applications based on the video tagging service. Video tag client 610 may include an interactive client interface that allows a user to provide inputs such as user passwords, video tag commentary strings, input for a video tag playback controller 310, etc., such as described in FIGS. 3A to 5.

DRM agent 620 may include hardware or a combination of hardware and software that may retrieve security information (e.g., decryption keys) from license server 128 (or another device) to access protected content received from content delivery system 116. For example, DRM agent 620 may communicate with video tag client 610 to identify selected content and coordinate the receipt of DRM security information (e.g., from license server 128) with the protected content from content delivery system 116. Protected content may include, for example, any content encrypted to enforce copyright restrictions.

Although FIG. 6 shows example functional components of STB 142, in other implementations, STB 142 may include fewer functional components, different functional components, differently arranged functional components, and/or additional functional components than depicted in FIG. 6. Alternatively, or additionally, one or more functional components of STB 142 may perform one or more other tasks described as being performed by one or more other functional components of STB 142.

Figure 7:
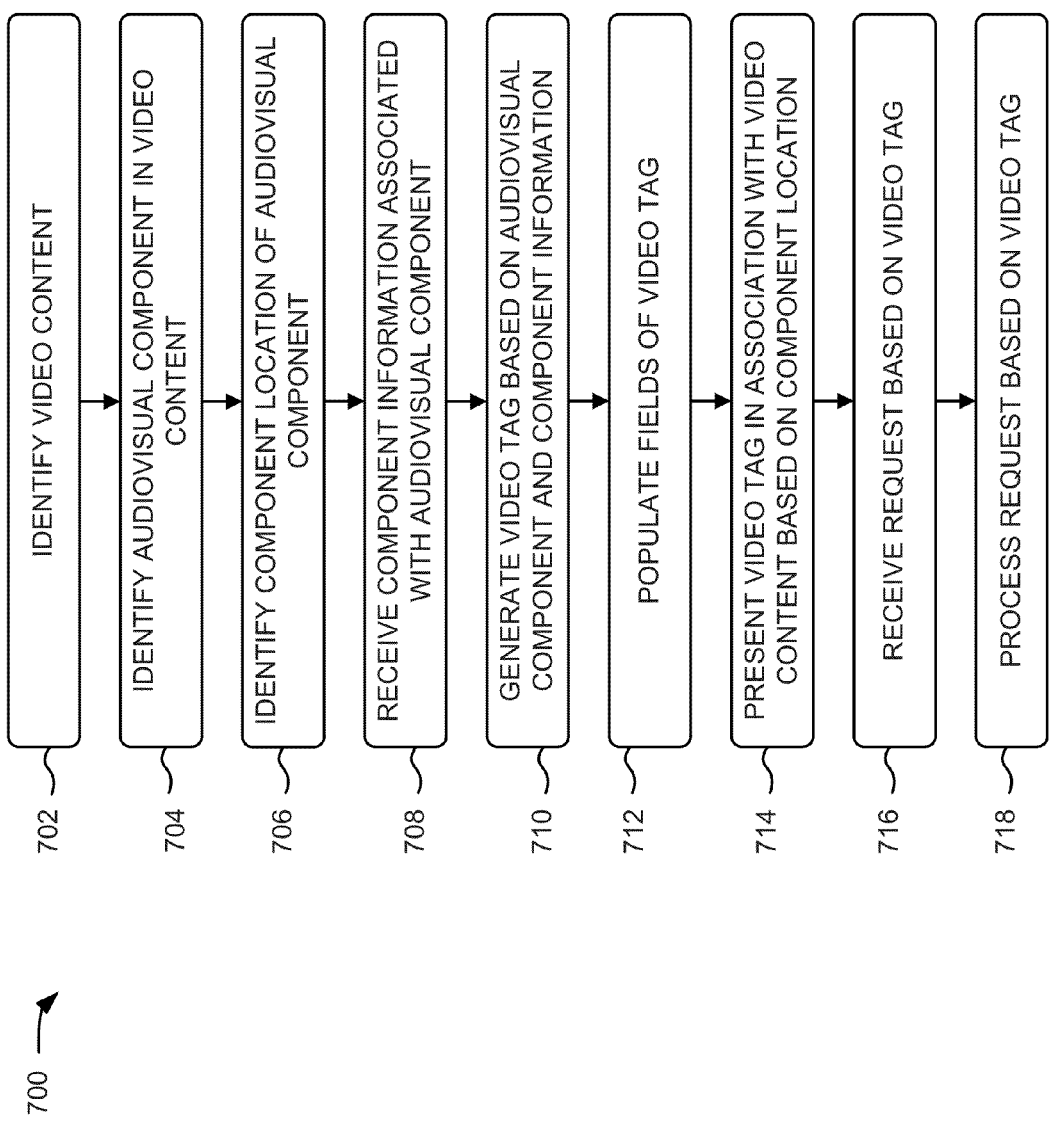
FIG. 7 is a flowchart, of an exemplary process for video tagging.

FIG. 7 is a flowchart of an exemplary process 700 for providing video tagging of video content 304. Process 700 may execute in video tagging server 118. It should be apparent that the process discussed below with respect to FIG. 7 represents a generalized illustration and that other elements may be added or existing elements may be removed, modified or rearranged without departing from the scope of process 700.

At block 702, video tagging server 118 may identity video content 304 that includes audiovisual components 306. For example, video content 304 may be provided to video tagging server 118 during pre-processing of video content 304 in service provider network 110. Video content 304 may include sequential video programs, such as movies, sports programs, etc. Alternatively, video content 304 may include non-sequential programs, such as a video game, etc.

At block 704, video tagging server 118 may receive an identification of audiovisual component 306. For example, video tagging server 118 may receive the identification of audiovisual component 306 in video tag information provided by a user (e.g., when the user video tags an audiovisual component as described below with respect to process 800 and FIG. 8), an administrator for network 110, or by a sponsor. The video tag information may include identification of audiovisual components 306 (e.g., a particular product), component locations for each audiovisual component 306 (i.e., a screen location of the product), and component information associated with particular audiovisual components (e.g., a price for the product, a website associated with the product) (shown in blocks 704 to 708).

According to another embodiment, video tagging server 118 may identify audiovisual components 306. Video tagging server 118 may perform sound and/or image analysis of video content 304 to identify audiovisual components 306. For example, video tagging server 118 may perform facial matching analysis to determine occurrences of an actor in a movie. For non-sequential programs, video tagging server 118 may identify each distinct element (e.g., characters in a video game). An identifier, such as the name of the actor or character, may be stored in association with occurrences of the audiovisual component 306.

Video tagging server 118 may identify component locations of audiovisual components 306 (block 706). The component location indicates a time and a screen position with which the audiovisual component 306 is associated with in the video content 304. For example, video tagging server 118 may receive a component location of an audiovisual component from a user device 146 when a user video tags the audiovisual component. The user may track the component locations of audiovisual component in video content to identify a range of time and space in which the object is located, creating a motion path for the audiovisual component. Alternatively, video tagging server 118 may identify a time and/or place (i.e., screen location) in the video content 304 at which the audiovisual component 306 occurs.

Video tagging server 118 may identify component information associated with the audiovisual component 306 (block 708). For example, video tagging server 118 may receive component information associated with the audiovisual component 306 from a user device 146 when a user video tags the audiovisual component. The types of information (e.g., a restriction on links to websites) that the end user may provide may be limited based on a particular program and security features selected by an administrator of network 110. Alternatively, video tagging server 118 may search (e.g., a biographical database, the Internet) based on a name of the audiovisual component 306. Video tagging server 118 may search for links and applications related to the audiovisual component (e.g., such as a shopping website for clothing items).

Video tagging server 118 may generate a video tag 308 based on the audiovisual component 306 (block 710). For example, video tagging server 118 may provide information that may be used by a receiving user device 146 to render a video tag 308 at the component location in video content 304.

Video tagging server 118 may populate one or more fields associated with the video tag 308 based on the component information, the identification of the audiovisual component, and the component location (block 712). The one or more fields may include a name of the audiovisual component, a position in the video content of the audiovisual component, properties associated with the audiovisual component and information provided by at least one of an end user, an administrator, or a service provider. For example, video tagging server 118 may compile a biography, relevant website links and other component information in a predetermined format (e.g., an identity card for actors).

At block 714, video tagging server 118 may present video tag 308 in association with the video content 304. For example, video tagging server 118 may present video tag 308 as an overlay (e.g., such as video tag playback controller 310) for video content 304. The overlay may be included in a video stream provided to users of video content 304 and may allow users to interact with video tags 308, such as selecting particular video tags and accessing the component information associated with the video tags 308, flagging the video tags 308, providing ratings for the video tags 308, etc.

According to one embodiment, video tagging server 118 may present video tag 308 in association with video content 304 at the component location. For example, video tagging server 118 may process audiovisual component 306 to create an association of audiovisual component with the video tag 308. Video tag 308 may occur in the video content 308 in proximity to audiovisual component 306. Alternatively, input received from a user with respect to video tag 308 may appear based on user input provided in association with audiovisual component (e.g. the user may touch the screen location of audiovisual component 306 on a touch screen device).

According to another embodiment, video tagging server 118 may present video tag 308 in a computer accessible document 494, such as a web page. The web page may be specified by the user, such as a social media website. The embedded video tag 308 may allow requesters to access the video content 304 at the component location after they have provided appropriate authorization (such as a log in or subscription information) to the service provider associated with the video content 304.

Video tagging server 118 may receive requests based on the video tag 308 from user devices 146 (block 716). For example, a user may click on the video tag 308 while watching video content 304. The user may request an API for a shopping website, etc.

Video tagging server 118 may process the request (block 718). For example, video tagging server 118 may provide a link to a requested API.

FIG. 8 is a flowchart of an exemplary process 800 for providing video tagging of video content 304. Process 800 may execute in user device 146. It should be apparent that the process discussed below with respect to FIG. 8 represents a generalized illustration and that other elements may be added or existing elements may be removed, modified or rearranged without departing from the scope of process 800.

At block 802, user device 146 may initiate video tag playback controller 310. For example, the user may touch a screen of user device 146. Video tag playback controller 310 may appear on the screen of user device 146. Alternatively, video tag playback controller 310 may initiate with video content 304.

At block 804, user device 146 may identify an audiovisual component 306 that is to be video tagged. For example, user device 146 may receive a touch input at a screen location that corresponds to the audiovisual component. The selected audiovisual component 306 may "glow" or otherwise indicate that it is to be video tagged.

At block 806, user device 146 may identify a component location of the audiovisual component 306. For example, user device 146 may store a screen location and a time in the video content 304 at which the audiovisual component occurs. The video content 304 may have been pre-processed so that all occurrences of the audiovisual component are stored in association with received video tags 308 when the audiovisual component is identified.

At block 808, user device 146 may receive a video tag commentary string, input by the user, for example using alphanumeric keypad 362. User device 146 may also receive addresses to which the video tag 308 is to be provided. For example, the user may input a social media website link, an email address, etc. Alternatively, the video tags may be automatically linked to particular addresses.

At block 810, user device 146 may determine a video tag 308 based on the video tag commentary string. For example, user device 146 may prepare a video tag 308 in a particular visual format. User device 146 may also flag inappropriate language. User device 146 may display the video tag 308 and prompt the user to input the video tag 308 (e.g., "are you ready to send?").

User device 146 may send the video tag 308 to selected addresses (block 812). For example, user device may send the video tag 308 to selected social media websites, video tagging server 118, etc.

Systems and/or methods described herein may implement video tagging of video content. Objects or sounds may be identified in the video content and a video tag may be inserted in the video content in association with the objects (or sounds). The video tags may include information relating to the object, such as purchasing information, statistics, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks may be modified in other implementations. Further, non-dependent blocks may be performed in parallel. Although video content, video tags and video tag playback controller are described with respect to a single user device, video tags may be implemented in a multiple device system, such as when video content is displayed on a first device and video tags are "pushed" to a second device associated with the first device.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   identifying video content that includes an audiovisual component;
   receiving an identification of the audiovisual component;
   receiving at least one component location of the audiovisual component in the video content, wherein the audiovisual component is a separately identifiable component of the video content and each component location indicates a time and a screen position with which the audiovisual component is associated with in the video content;

receiving component information associated with the audiovisual component;

generating a video tag based on the audiovisual component and the component information, wherein the video tag includes an indication of the at least one component location;

populating one or more fields associated with the video tag based on the component information, the identification of the audiovisual component, and the at least one component location, wherein the one or more fields include a name of the audiovisual component, a position in the video content of the audiovisual component, properties associated with the audiovisual component and information provided by at least one of an end user, an administrator, or a service provider;

presenting the video tag to a user, wherein the video tag is selectable to present the video content with the video tag in association with the audiovisual component at the at least one component location;

receiving a request for the video content from a requester based on the video tag;

determining a subscription status of the requester with the service provider associated with the video content; and providing access, based on the subscription status of the requester, to the video content at a starting component location, wherein the starting component location is based on the at least one component location.

2. The computer-implemented method of claim 1, further comprising:

presenting the video tag at a computer accessible document, wherein the computer accessible document is selected based on input provided by at least one of the user, a sponsor, and an administrator for a service provider associated with the video content.

3. The computer-implemented method of claim 2, wherein the computer accessible document is searchable based on one or more of the component information, the identification of the audiovisual component, and the video content.

4. The computer-implemented method of claim 1, further comprising:

providing a video tag playback controller, wherein the video tag playback controller is an overlay on the video content that provides control options for the user to select types of video tags to display based on the one or more fields included in each video tag; and presenting the video tag corresponding to the video content based on the video tag playback controller.

5. The computer-implemented method of claim 4, wherein the component information includes a request link for an application programming interface (API) associated with the audiovisual component, further comprising:

receiving a request for the API associated with the audiovisual component; and providing the requested API, wherein the API is associated with additional information based on the audiovisual component or a sponsor associated with the audiovisual component.

6. The computer-implemented method of claim 5, wherein the API associated with the audiovisual component includes a link to a video tag enabled website that is operable to transmit video tags, further comprising:

receiving an additional video tag from the video tag enabled website;

identifying information included in the one or more fields of the additional video tag; and associating the additional video tag with video content based on the information included in the one or more fields of the additional video tag.

7. The computer-implemented method of claim 4, wherein presenting the video tag in association with the video content further comprises:

receiving a selection of at least one category for display of video tags;

presenting the video tag in association with the video content if the video tag is based on the at least one category.

8. The computer-implemented method of claim 4, further comprising:

receiving a search request for video tags based on one or more of the component information, the identification of the audiovisual component, and the video content; and providing a list of video tags to the user, wherein each of the listed video tags is selectable to provide associated video content at a time associated with the listed video tag.

9. The computer-implemented method of claim 1, wherein receiving the identification of the audiovisual component in the video content further comprises:

accessing a database of identified audiovisual components;

performing one or more of a sound analysis or an image analysis to determine an identity of the audiovisual component.

10. The computer-implemented method of claim 1, wherein receiving the identification of the at least one component location further comprises:

identifying an occurrence of the audiovisual component; and tracking the audiovisual component on a frame by frame basis.

11. A method, comprising:

identifying an audiovisual component in video content, wherein the audiovisual component is a separately identifiable component of the video content;

identifying a component location of the audiovisual component;

generating a video tag based on the audiovisual component and the component location;

sending the video tag to at least one selected address, wherein the video tag is operable to connect a receiving party to the video content with the video tag in association with the audiovisual component at the component location;

receiving a request for the video content from a requester based on the video tag;

determining a subscription status of the requester with a service provider associated with the video content; and providing access, based on the subscription status of the requester, to the video content at a starting component location, wherein the starting component location is based on the at least one component location.

12. The method of claim 11, further comprising:

receiving a video tag commentary string including alphanumeric characters input by a user; and wherein the video tag includes the video tag commentary string.

13. The method of claim 11, further comprising:

initiating a video tag playback controller, wherein the video tag playback controller is operable to receive instructions based on one or more video tags to find, play, save, skip or record the video content based on the one or more video tags.

14. The method of claim 11, further comprising:
receiving a search string;
sending the search string to a video tag processing device, wherein the video tag processing device is operable to provide a list of video tags based on the search string;
receiving the list of video tags based on the search string;
receiving a selection of a video tag from the list of video tags; and
providing video content at the video tag.

15. The method of claim 11, wherein the video tag includes one or more or a highlighting of the audiovisual component, and a marker in proximity to the audiovisual component.

16. A device, comprising:
a memory to store a plurality of instructions; and
a processor configured to execute instructions in the memory to:
receive video content that includes an audiovisual component;
identify the audiovisual component;
identify at least one component location of the audiovisual component in the video content, wherein the audiovisual component is a separately identifiable component of the video content and each component location indicates a time and a screen position with which the audiovisual component is associated with in the video content;
determine component information associated with the audiovisual component;
generate a video tag based on the audiovisual component and the component information, wherein the video tag includes an indication of the at least one component location;
populate one or more fields associated with the video tag based on the component information, the identification of the audiovisual component, and the at least one component location, wherein the one or more fields include a name of the audiovisual component, a position in the video content of the audiovisual component, properties associated with the audiovisual component and information provided by at least one of an end user, an administrator, or a service provider;
present the video tag at a web page, wherein the video tag is selectable to present the video content with the video tag in association with the audiovisual component at the at least one component location and the web page is selected based on input provided by at least one of the user, a sponsor, and an administrator for a service provider associated with the video content;
receive a request for the video content from a requester based on the video tag;
determine a subscription status of the requester with the service provider associated with the video content; and
provide access, based on the subscription status of the requester, to the video content at a starting component location, wherein the starting component location is based on the at least one component location.

17. The device of claim 16, wherein the processor is further to:
provide a request link for an application programming interface (API) associated with the audiovisual component in the video tag;
receive a request for the API associated with the audiovisual component; and
providing the requested API, wherein the API is associated with additional information based on the audiovisual component or a sponsor of associated with the audiovisual component.

18. The device of claim 16, wherein the processor is further to:
present the video tag at a computer accessible document, wherein the computer accessible document is selected based on input provided by at least one of the user, a sponsor, and an administrator for a service provider associated with the video content.

19. The device of claim 18, wherein the computer accessible document is searchable based on one or more of the component information, the identification of the audiovisual component, and the video content.

20. A computer-readable medium including instructions to be executed by a processor, the instructions including one or more instructions, when executed by the processor, for causing the processor to:
identify video content that includes an audiovisual component;
receive an identification of the audiovisual component;
receive at least one component location of the audiovisual component in the video content, wherein the audiovisual component is a separately identifiable component of the video content and each component location indicates a time and a screen position with which the audiovisual component is associated with in the video content;
receive component information associated with the audiovisual component;
generate a video tag based on the audiovisual component and the component information, wherein the video tag includes an indication of the at least one component location;
populate one or more fields associated with the video tag based on the component information, the identification of the audiovisual component, and the at least one component location, wherein the one or more fields include a name of the audiovisual component, a position in the video content of the audiovisual component, properties associated with the audiovisual component and information provided by at least one of an end user, an administrator, or a service provider; and
present the video tag to a user, wherein the video tag is selectable to present the video content with the video tag in association with the audiovisual component at the at least one component location;
receive a request for the video content from a requester based on the video tag;
determine a subscription status of the requester with a service provider associated with the video content; and
provide access, based on the subscription status of the requester, to the video content at a starting component location, wherein the starting component location is based on the at least one component location.

* * * * *